June 28, 1960 G. HAMILTON ET AL 2,942,568

MANUFACTURE OF JUNCTION TRANSISTORS

Filed Oct. 15, 1954

*INVENTORS:*
ROBERT M. WOOD
GEORGE HAMILTON
*BY* Laurence Burns
ATTORNEY 2,942,568

MANUFACTURE OF JUNCTION TRANSISTORS

George Hamilton, Newburyport, and Robert M. Wood, Hamilton, Mass., assignors, by mesne assignments, to Sylvania Electric Products Inc., Wilmington, Del., a corporation of Delaware Filed Oct. 15, 1954, Ser. No. 462,581

1 Claim. (Cl. 113—99)

This invention relates to alloyed junction transistors and the like, and in particular to methods and apparatus for manufacturing such devices.

Such devices have previously been fabricated by methods such as shown in the copending application Serial Number 354,130, filed May 11, 1953, by R. M. Wood, now Patent No. 2,756,483, or by placing a small piece of the alloying material on top of a semiconductor wafer, heating the combination, then reversing the wafer and repeating the procedure on the other side. Such methods, while useful for some purposes, do not confine the alloy material closely enough to a particular spot, but allow it to spread outward to a much larger radius when heated. Such a spread increases the electrode capacitance, which is undesirable, and thereby reduces the factor of merit of the transistor, which factor varies as the reciprocal of the product of the capacitance and the base resistance.

The spreading can be reduced by placing a refractory tube around the alloy material, but since such a tube can only be used effectively when the alloy material is on top of the semiconductor wafer, the alloy junction has to be made first on one side of the wafer, and the latter then turned over so that a junction can also be made to the other side. Such a procedure is awkward, unsuitable to mass production, and not very uniform.

With the method and apparatus of the present invention, however, junctions can be formed simultaneously on opposite sides of the semiconductor wafer without much spreading, thereby facilitating the mass production of such devices and insuring accurate alignment and low capacitance.

Other objects, features and advantages of the invention will be apparent from the following specification taken in conjunction with the accompanying drawings, in which.

Figures 1, 2, 3:
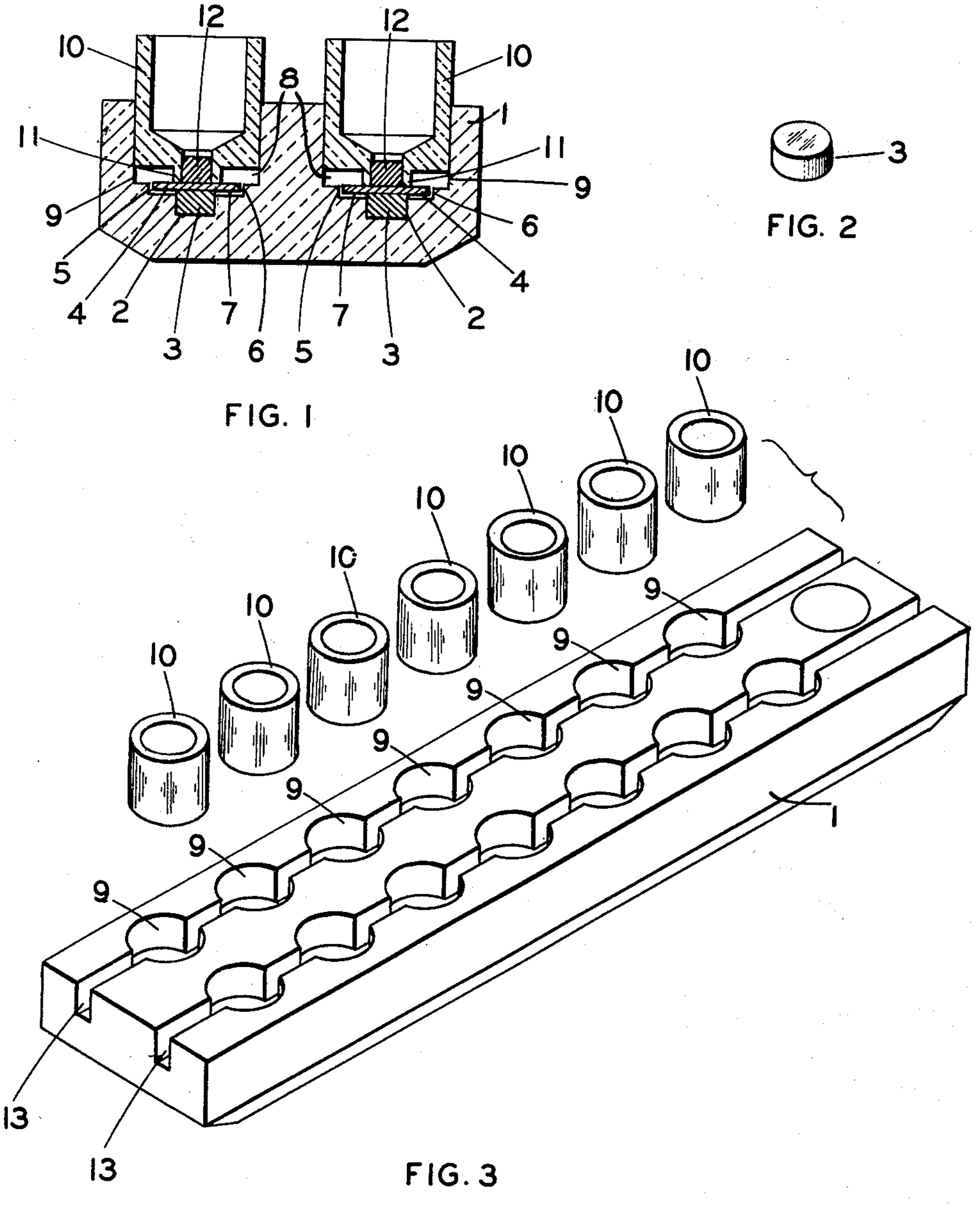
Figure 1 is an enlarged view of a device according to an embodiment of the invention.
Figure 2 is an enlarged view of one of the alloy pellets used with said device.
Figure 3 is a perspective view of a refractory boat embodying several structures such as shown in Figure 1.

In Figure 1, the bottom portion of the boat 1, which can be of graphite, quartz or similar refractory material which will not react with the semiconductor or alloy materials used, contains the cylindrical cavities 2, into which the cylindrical alloy pellets 3 can be inserted. The pellets are of a height greater than the depth of the cavity 2 so that the pellet extends out of said cavity by a small amount, which for good results will vary somewhat with the type and size of transistor. However, it must be extremely small, and will not ordinarily be greater than 0.0015 inch nor less than 0.0003 inch. The amount by which the pellet 3 extends out of the cavity 2 determines the amount by which the radius of the diffused junction exceeds the radius of the original pellet. The pellet must extend somewhat above the top of the cavity 2 in order to make good contact to the semiconductor wafer, which can be of germanium, silicon, alloys thereof or other suitable materials.

The semiconductor wafer 4 can be of any convenient shape, generally rectangular, and is held in place by the sides 5, 6 of the intermediate cavity 7. An outer cylindrical cavity 8, defined by the side walls 9, has slidably fitted therein the cylindrical cup 10, from which the small annular cylinder 11 projects downward at its bottom end to rest on the top of semi-conductor wafer 4.

A cylindrical alloy pellet 12 is at the bottom of projecting cylinder 11 and rests on top of the semiconductor wafer 4 in register with lower pellet 3. The upper pellet 12 will be somewhat smaller than the lower pellet 3, because the upper one can be for an emitter electrode, which is generally smaller than the collector. Pellet 3 can be the collector electrode.

Several composite cavities 2, 7, 8 of the type described above can be fabricated in a single boat as shown in Figure 3. The cavities 8 are connected in a longitudinal line by the slots 13.

Any of the known alloying materials can be used in the pellets 3, an alloy of about 90% by weight of lead and about 10% by weight of antimony being a suitable alloy if the germanium is of the p-type, for example having indium as an acceptor impurity. The amount of indium present may be 1 part per hundred million parts of germanium.

In performing our process, a pellet 3 of the lead-antimony alloy, for example, is dropped into the smaller and lower cavity 2, and a semiconductor wafer 4, for example of germanium with an indium impurity, is placed over pellet 3 and in cavity 7, and then the cup 10 is slid down into cavity 8 and pellet 12 dropped into the bottom of the annular cylinder 11 at the bottom of cup 10. Several such assemblies can be made up in the boat 1 of Figure 3, and all heated simultaneously in a furnace to a temperature of about 750° C. in an ambient atmosphere of hydrogen at about atmospheric pressure of 760 mm. of mercury. The heating is continued for about ten minutes, after which the filled boat is cooled and removed from the furnace. After the pellets are joined to the crystal by the heating, they are generally called "dots." Connection to these dots are made in any manner well known in the art, for example by soldering lead-in wires thereto, or by forcing the lead-in wires into holes punched in the dots with a needle.

In a typical case, corresponding to an n-p-n junction device shown in an application Serial No. 462,582 filed concurrently herewith by Maynard Dawson and George Hamilton, and now abandoned, the semiconductor wafer 4 can be germanium of 2 mil thickness. The pellet 3 can have an initial height of 0.015 inch, in which case if the pellet extends 0.0005 inch above the top of cavity 2, the radius of the pellet on heating will only increase by about 0.001 inch in radius during manufacture, the pellet having an initial radius of about 0.0065 inch.

The pellet 12 can be about 0.005 inch in radius in the example given, and have a height of 0.015 inch. The germanium wafer 4 can be about one-eighth inch wide and one quarter inch long.

Such a unit will have a collector capacitance of only about 3 micromicrofarads.

Although the invention has been described in connection with a particular example, various modifications can be made within the spirit and scope of the invention.

What we claim is:

Apparatus for manufacturing alloy junction semi-conductor devices from a semi-conductor piece and cylindrical alloy pellets of predetermined sizes, said apparatus comprising: a refractory boat having a chamber the interior of which, in cross section, is stepped, defining a bottom recess of small area, the height of rise of the step of said bottom recess being slightly less than the predetermined height of one of said pellets; the rise of the next above step defining a second recess of larger cross section than the bottom recess for holding said semi-conductor piece above, and resting on top of, said one of said pellets; the rise of the next step thereabove defining a cavity of larger cross section than said second recess; and a refractory plug fitting closely in said cavity, said plug having an opening through its bottom into which another of said pellets can be placed to rest on said semi-conductor piece.

References Cited in the file of this patent

UNITED STATES PATENTS

| | | |
|---|---|---|
| 2,449,986 | Grace | Sept. 28, 1948 |
| 2,521,687 | Cameron | Sept. 12, 1950 |
| 2,697,052 | Dacey | Dec. 14, 1954 |
| 2,708,255 | White | May 10, 1955 |
| 2,708,646 | North | May 17, 1955 |
| 2,756,483 | Wood | July 31, 1956 |
| 2,791,524 | Ozarow | May 7, 1957 |

FOREIGN PATENTS

| | | |
|---|---|---|
| 868,354 | Germany | Feb. 23, 1953 |
| 525,280 | Belgium | Jan. 15, 1954 |
| 1,088,286 | France | Sept. 8, 1954 |

OTHER REFERENCES

Electronics, October 1953, pages 131–134.

Transistors Today and Tomorrow, pamphlet published by The Department of Information, Radio Corporation of America, New York, N.Y., page 22, March 23, 1953.